Patented Oct. 13, 1925.

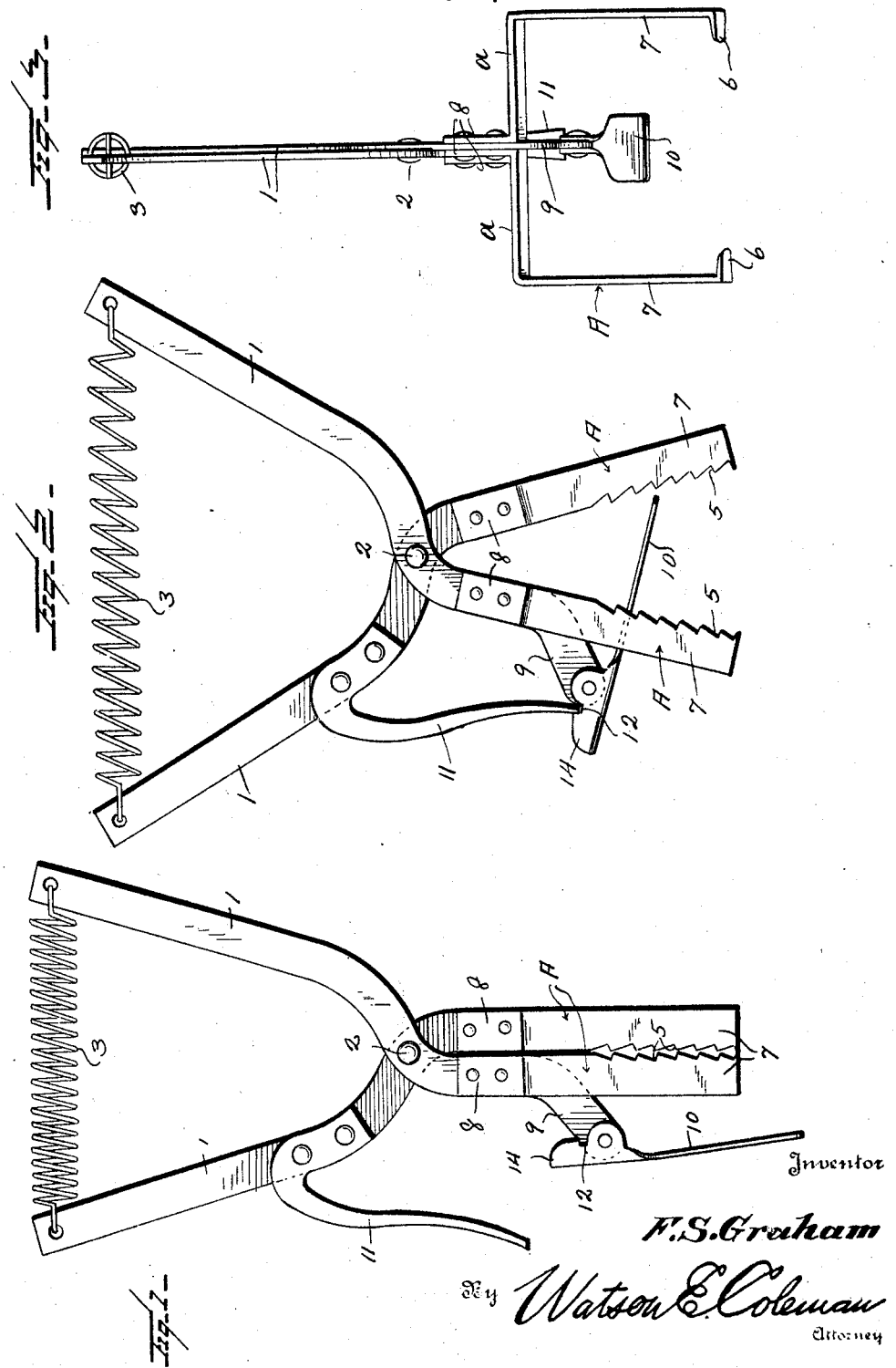

1,557,043

UNITED STATES PATENT OFFICE.

FREEMONT S. GRAHAM, OF ORTING, WASHINGTON.

TRAP.

Application filed July 12, 1924. Serial No. 725,725.

*To all whom it may concern:*

Be it known that I, FREEMONT S. GRAHAM, a citizen of the United States, residing at Orting in the county of Pierce and State of Washington, have invented certain new and useful Improvements in Traps, of which the following is a specification, reference being had to the accompanying drawings.

This invention relates to certain improvements in traps and has relation more particularly to a device of this general character especially designed for the purpose of capturing moles and kindred burrowing animals, and it is an object of the invention to provide a novel and improved device of this general character embodying a structure whereby the same may be readily and conveniently set and effectively maintained in applied position with respect to the burrow or runway and whereby the trap is released by the rising surface of the ground due to the passage of the mole or kindred animal.

The invention consists in the details of construction and in the combination and arrangement of the several parts of my improved trap whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation of a trap constructed in accordance with an embodiment of my invention with the jaws in closed position;

Fig. 2 is a view in side elevation of the trap in set position;

Figure 3 is a view in front elevation of the structure as illustrated in Figure 2.

My improved trap as herein disclosed, comprises a pair of substantially U-shaped jaws A carried by the elongated cross members 1. The members 1 overlie each other at a point closely adjacent to the jaws A and said overlying portions are pivotally connected, as at 2, so that the jaws are capable of relative swinging movement. The long or outer portions of the members are disposed in divergence and the outer extremities thereof are connected by the retractile spring 3 of sufficient tension to forcibly move the jaws A one toward the other to capture a mole or the like passing therebetween when the jaws A are in set position. The side members of the jaws A have their opposed marginal portions provided with the teeth 5 and the outer ends of the jaws are provided with the inturned lugs 6 which operate to prevent the trap, when released, from jumping over the mole or the like caught between the jaws A and also to prevent the trap from lifting out of the soft earth in which it is set.

Each of the jaws A comprises two sections 7 of substantially duplicate construction and substantially L-shaped in form, the foot portion *a* being comprised in the intermediate or base portion of the jaw and terminating in an outstanding extension 8 which is directly secured to the associated or inner end portion of a member 1.

One of the members 1 is extended beyond the intermediate or base portion of the jaw A carried thereby and also directed outwardly to provide a relatively short incline arm 9. Pivotally connected to the outer extremity of this arm 9 is an end portion of a trip pan or trigger 10 which extends between the jaws A and has its major portion substantially flat so that when the trap is in applied or set position to straddle a burrow with the jaws A embedded in the ground at opposite sides of such burrow, the pan or trigger will rest on the surface of the ground directly above the burrow whereby the animal as it passes under the pan or trigger will cause the resultant rises of the surface to move the pan or trigger upwardly to release the jaws so that the animal will be effectively caught therebetween as said jaws are moved forcibly one toward the other by the action of the spring 3.

The second member 1 outwardly of its pivotal connection 2 has secured thereto a rigid arm 11 extending outwardly on a predetermined curvature in a direction toward the jaws A and the outer end of said arm 11 is adapted to engage within a notch 12 provided in the tail-piece 14 carried by the pan or trigger 10 whereby the jaws A are held in their open or set position.

My improved trap is highly efficient for the purpose for which it is intended yet at the same time is decidedly simple and can be set with convenience and facility. When it is desired to set the trap it is only necessary to pull outwardly on the outer end portions of the members 1 to effect the desired separation of the jaws A until the outer end of the arm 9 contacts with the outer end of the arm 11 and by then swinging the jaws A in a direction toward the arm 11 the pan or trigger 10 will swing outwardly resulting in the outer end of the arm 11 engaging within the notch 12 of the tail-piece 14.

From the foregoing description it is thought to be obvious that a trap constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A trap of the class described comprising a pair of cross members pivotally connected one to the other, jaws carried by similar ends of the members, the opposite end portions of the members being in divergence, a retractile member interposed between and secured to said opposite end portions of the members, one of said members extending outwardly beyond the adjacent portion of the jaw secured thereto and directed outwardly with respect thereto to provide a relatively short inclined arm, a trigger pivotally engaged with the outer end portion of said arm and provided with a tailpiece having a notch, and an arm carrier by the second member at the opposite side of its pivotal connection to engage within the notch of the tail-piece when the jaws are separated to hold said jaws in such separated relation, said trigger substantially bridging the space between the jaws when separated.

2. A trap of the class described comprising a pair of cross members pivotally connected one to the other, jaws carried by similar ends of the members, the opposite end portions of the members being in divergence, a retractile member interposed between and secured to said opposite end portions of the members, one of said members extending outwardly beyond the adjacent portion of the jaw secured thereto and directed outwardly with respect thereto to provide a relatively short inclined arm, a trigger pivotally engaged with the outer end portion of said arm and provided with a tail-piece having a notch, and an arm carried by the second member at the opposite side of its pivotal connection to engage within the notch of the tail-piece when the jaws are separated to hold said jaws in such separated relation, said trigger substantially bridging the space between the jaws when separated, said arms contacting to limit the extent of separating movement of the jaws.

In testimony whereof I hereunto affix my signature.

FREEMONT S. GRAHAM.